United States Patent
Komiya et al.

(10) Patent No.: US 9,624,824 B2
(45) Date of Patent: Apr. 18, 2017

(54) CONTROL DEVICE AND CONTROL METHOD FOR INTERNAL COMBUSTION ENGINE

(71) Applicant: NISSAN MOTOR CO., LTD., Yokohama-shi, Kanagawa (JP)

(72) Inventors: Ayumi Komiya, Isehara (JP); Hirofumi Tsuchida, Yokosuka (JP); Mitsuhiro Akagi, Hiratsuka (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/414,750

(22) PCT Filed: Jun. 10, 2013

(86) PCT No.: PCT/JP2013/065991
§ 371 (c)(1),
(2) Date: Jan. 14, 2015

(87) PCT Pub. No.: WO2014/013814
PCT Pub. Date: Jan. 23, 2014

(65) Prior Publication Data
US 2015/0184587 A1    Jul. 2, 2015

(30) Foreign Application Priority Data
Jul. 19, 2012    (JP) .............................. 2012-160106

(51) Int. Cl.
*F02B 47/08*    (2006.01)
*F02B 37/18*    (2006.01)
(Continued)

(52) U.S. Cl.
CPC .............. *F02B 47/08* (2013.01); *F02B 37/16* (2013.01); *F02B 37/18* (2013.01); *F02D 21/08* (2013.01);
(Continued)

(58) Field of Classification Search
CPC ...... F02B 47/08; F02B 37/00; F02D 41/0007; F02M 25/07
(Continued)

(56) References Cited

U.S. PATENT DOCUMENTS

| 2001/0053954 | A1 | 12/2001 | Kawaguchi et al. | |
| 2011/0168143 | A1* | 7/2011 | VanDerWege et al. | . 123/568.15 |
| 2012/0037134 | A1* | 2/2012 | Jankovic et al. | ........ 123/568.21 |

FOREIGN PATENT DOCUMENTS

| JP | 2001-152916 A | 6/2001 |
| JP | 2001-152916 A | 6/2001 |

(Continued)

*Primary Examiner* — Carlos A Rivera
*Assistant Examiner* — Kevin Lathers
(74) *Attorney, Agent, or Firm* — Drinker Biddle & Reath LLP (57) ABSTRACT

In a case where EGR is started in a supercharging region, an opening degree of a waste gate valve (17) is changed at a timing T1 at which an EGR ratio in a first predetermined position changes by valve open of an EGR control valve (21). In a case where EGR is started in a non-supercharging region, a throttle valve (5) is changed at a timing T2 at which an EGR ratio in a second predetermined position changes by valve open of the EGR control valve (21). With these controls, it is possible to suppress an occurrence of torque step upon start of the EGR without distinction between the supercharging region and the non-supercharging region.

6 Claims, 8 Drawing Sheets

(51) Int. Cl.
    *F02D 21/08*     (2006.01)
    *F02D 41/00*     (2006.01)
    *F02B 37/16*     (2006.01)
    *F02M 26/06*     (2016.01)
    *F02M 26/49*     (2016.01)

(52) U.S. Cl.
    CPC ..... *F02D 41/0007* (2013.01); *F02D 41/0072* (2013.01); *F02M 26/06* (2016.02); *F02M 26/49* (2016.02); *F02D 41/0002* (2013.01); *F02D 2200/0402* (2013.01); *Y02T 10/144* (2013.01); *Y02T 10/42* (2013.01); *Y02T 10/47* (2013.01)

(58) Field of Classification Search
    USPC ........................................................ 123/350
    See application file for complete search history.

(56) References Cited

FOREIGN PATENT DOCUMENTS

| | | |
|---|---|---|
| JP | 2002-004901 A | 1/2002 |
| JP | 2006-194143 A | 7/2006 |
| JP | 2007-303380 A | 11/2007 |
| JP | 2011-112012 A | 6/2011 |

\* cited by examiner

CONTROL DEVICE AND CONTROL METHOD FOR INTERNAL COMBUSTION ENGINE

TECHNICAL FIELD

The present invention relates to a control device and a control method for an internal combustion engine that recirculates a part of exhaust gas to an upstream side of a supercharger.

BACKGROUND ART

There has been known a technique that, by performing so-called EGR which introduces exhaust gas into an intake system in accordance with an operating condition, improves exhaust performance and increases fuel economy of an internal combustion engine.

For instance, Patent Document 1 discloses a technique that, even during execution of the EGR, controls an opening degree of a nozzle vane of a variable displacement turbocharger so that an actual boost pressure becomes a target boost pressure that is calculated on the basis of an engine speed and an engine load.

In such a technique of Patent Document 1, however, although a steady torque demand can be satisfied when introducing the EGR from an upstream side with respect to a compressor housing of the turbocharger, there is a risk that a torque step caused by a transient change of a quantity of intake air in a cylinder which occurs upon start and stop of the EGR can not be avoided.

CITATION LIST

Patent Document

Patent Document 1: Japanese Patent Provisional Publication Tokkai No. 2007-303380

SUMMARY OF THE INVENTION

Thus, a control device of an internal combustion engine of the present invention comprises: an EGR ratio prediction unit that predicts, in advance, a change of an EGR ratio in a cylinder of the internal combustion engine which is caused by a change of an opening degree of an EGR control valve; and an intake control device that controls a quantity of intake air, and the intake control device is controlled on the basis of the prediction of the change of the EGR ratio by the EGR ratio prediction unit.

According to the present invention, in a case where the opening degree of the EGR control valve is changed, by predicting a timing at which the EGR ratio in the cylinder changes and controlling the intake control device on the basis of this prediction, it is possible to suppress an occurrence of the torque step without distinction between a supercharging region and a non-supercharging region.

DESCRIPTION OF EMBODIMENTS

Figure 1:
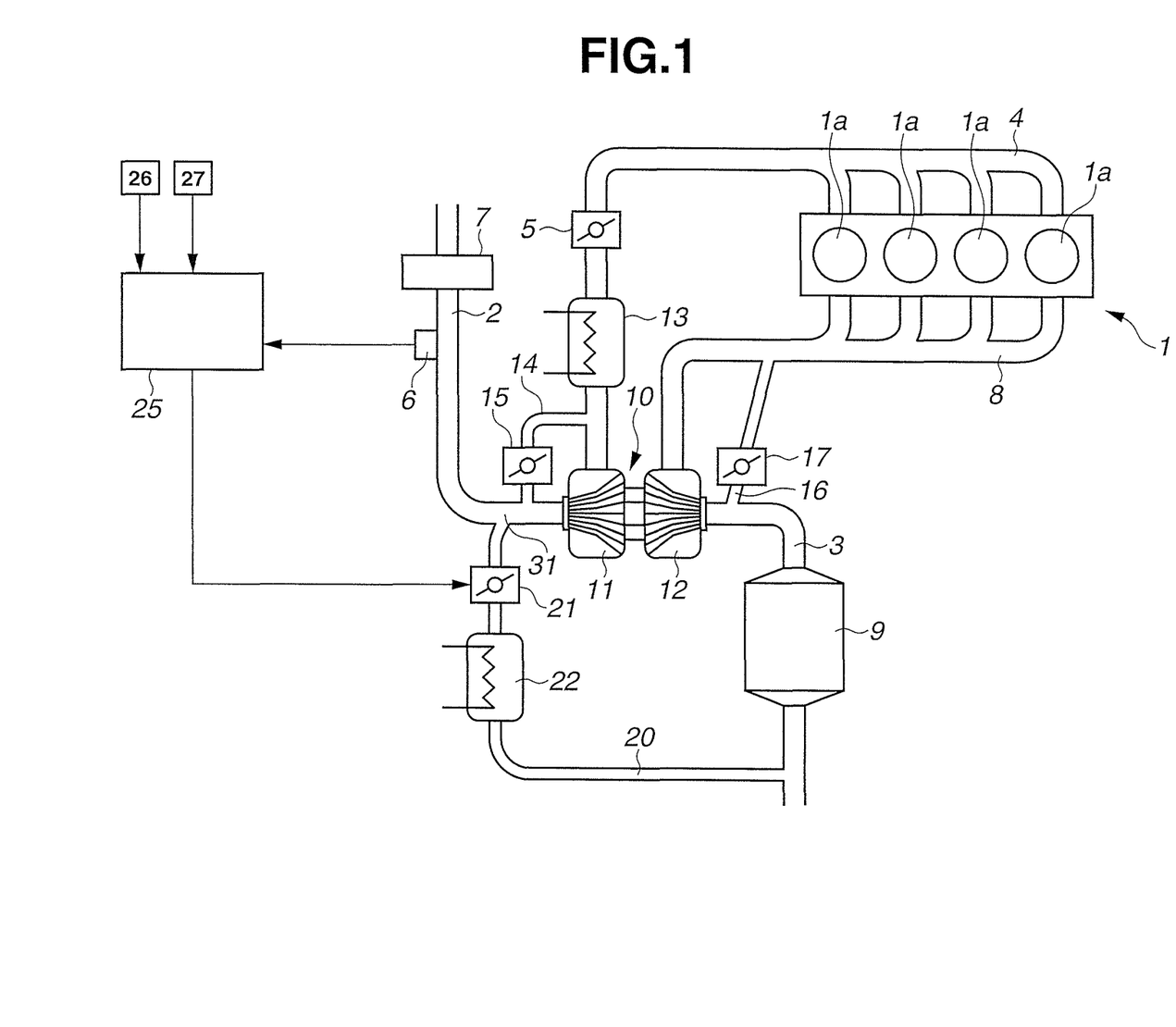
FIG. 1 is a general system block diagram of a control device of an internal combustion engine according to the present invention.

In the following description, embodiments of the present invention will be explained on the basis of the drawings. FIG. 1 is a general system block diagram of a control device of an internal combustion engine according to the present invention.

An internal combustion engine 1 is an engine that is mounted, as a driving source, in a vehicle such as an automobile. An intake passage 2 and an exhaust passage 3 are connected to each cylinder 1a of the internal combustion engine 1. The intake passage 2 connecting to the internal combustion engine 1 through an intake collector 4a and an intake manifold 4b is provided with an electrically controlled throttle valve 5 that is driven by an electric motor, also provided with an air flow meter 6 for detecting a quantity of intake air and an air cleaner 7 at an upstream side of the throttle valve 5. The exhaust passage 3 connecting to the internal combustion engine 1 through an exhaust manifold 8 is provided with an exhaust catalyst 9 such as a three-way catalyst for clean-up of exhaust gas.

Further, the internal combustion engine 1 is provided with a turbocharger 10 having a compressor 11 disposed in the intake passage 2 and a turbine 12 disposed in the exhaust passage 3 with these compressor 11 and turbine 12 coaxially arranged with each other. The compressor 11 is positioned at an upstream side with respect to the throttle valve 5, and is positioned at a downstream side with respect to the air flow meter 6. The turbine 12 is positioned at an upstream side with respect to the exhaust catalyst 9. Here, a reference sign 13 in FIG. 1 is an intercooler provided at an upstream side of the throttle valve 5.

A recirculation passage 14 bypassing the compressor 11 and connecting an upstream side and a downstream side of the compressor 11 is connected to the intake passage 2. In the recirculation passage 14, an electrically controlled recirculation valve 15 that controls an intake flow amount in the recirculation passage 14 is installed. The recirculation valve 15 is driven by an electric motor. As the recirculation valve 15, it is possible to use a so-called check valve that opens only when pressure at the downstream side of the compressor 11 becomes a predetermined pressure or higher.

An exhaust bypass passage 16 bypassing the turbine 12 and connecting an upstream side and a downstream side of the turbine 12 is connected to the exhaust passage 3. In the exhaust bypass passage 16, an electrically controlled waste gate valve 17 that controls an exhaust flow amount in the exhaust bypass passage 16 is installed. The waste gate valve 17 is driven by an electric motor. Therefore, in a supercharging region, by controlling an opening degree of the waste gate valve 17, boost pressure can be controlled. It is then possible to control the quantity of the intake air according to the opening degree of the waste gate valve 17.

The internal combustion engine 1 is an exhaust gas recirculation (EGR)-capable engine, and an EGR passage 20 is provided between the exhaust passage 3 and the intake passage 2. One end of the EGR passage 20 is connected to the exhaust passage 3 in a downstream side position of the exhaust catalyst 9, and the other end of the EGR passage 20 is connected to the intake passage 2 in an upstream side position of the compressor 11 at a downstream side of the air cleaner 7. In this EGR passage 20, an electrically controlled EGR control valve 21 and an EGR cooler 22 are installed. The EGR control valve 21 is driven by an electric motor. Further, an opening degree of the EGR control valve 21 is controlled by a control unit 25 so as to gain a target EGR ratio according to an operating condition.

The control unit 25 inputs a detection signal of the above-mentioned air flow meter 6, and also inputs detection signals of sensors such as a crank angle sensor 26 that detects a crank angle of a crankshaft (not shown) and an accelerator opening degree sensor 27 that detects a depression amount of an accelerator pedal (not shown).

The control unit 25 performs controls of an ignition timing, an air-fuel ratio etc. of the internal combustion engine 1 on the basis of these detection signals. The control unit 25 also performs an exhaust gas recirculation control (an EGR control) that recirculates a part of the exhaust gas from the exhaust passage 3 to the intake passage 2 on the basis of the detection signals by controlling the opening degree of the EGR control valve 21.

Further, the control unit 25 controls each opening degree of the throttle valve 5, the recirculation valve 15 and the waste gate valve 17 in accordance with the operating condition.

In the supercharging region, by controlling the opening degree of the waste gate valve 17 with the throttle valve 5 fully opened, the control is done so that fresh air required to attain an engine demand torque is supplied into the cylinder. As for a non-supercharging region, the opening degree of the throttle valve 5 is controlled with the opening degree of the waste gate valve 17 set to a predetermined constant degree so that the fresh air required to attain the engine demand torque is supplied into the cylinder.

That is, in the supercharging region, as an intake control device, the waste gate valve 17 controls the quantity of the intake air. In the non-supercharging region, as the intake control device, the throttle valve 5 controls the quantity of the intake air.

In such internal combustion engine 1, for instance, in a case where the EGR is started in the supercharging region, in order for the internal combustion engine 1 to attain the demand torque, it is necessary to control the waste gate valve 17 so that a quantity of the fresh air in the cylinder where the fresh air is lacking is supplied or compensated by the introduction of the EGR.

However, there occurs a response delay from a time point at which the opening degree of the EGR control valve 21 is changed up to a time point at which a change of an EGR ratio in the cylinder actually appears. Because of this, if a target value of the quantity of the intake air is changed, at a timing of the EGR start, to a target value of a case where the EGR is carried out, the quantity of the fresh air (a cylinder intake fresh air quantity) in the cylinder changes before the EGR ratio in the cylinder changes. A torque step thus occurs, and this causes deterioration in drivability.

Therefore, in the case where the EGR is started or stopped in the supercharging region, the change of the EGR ratio in the cylinder, which is caused by the change of the opening degree of the EGR control valve 21, is predicted in advance, then a cooperative control to control the opening degree of the waste gate valve 17 on the basis of this prediction is executed.

Figure 2:
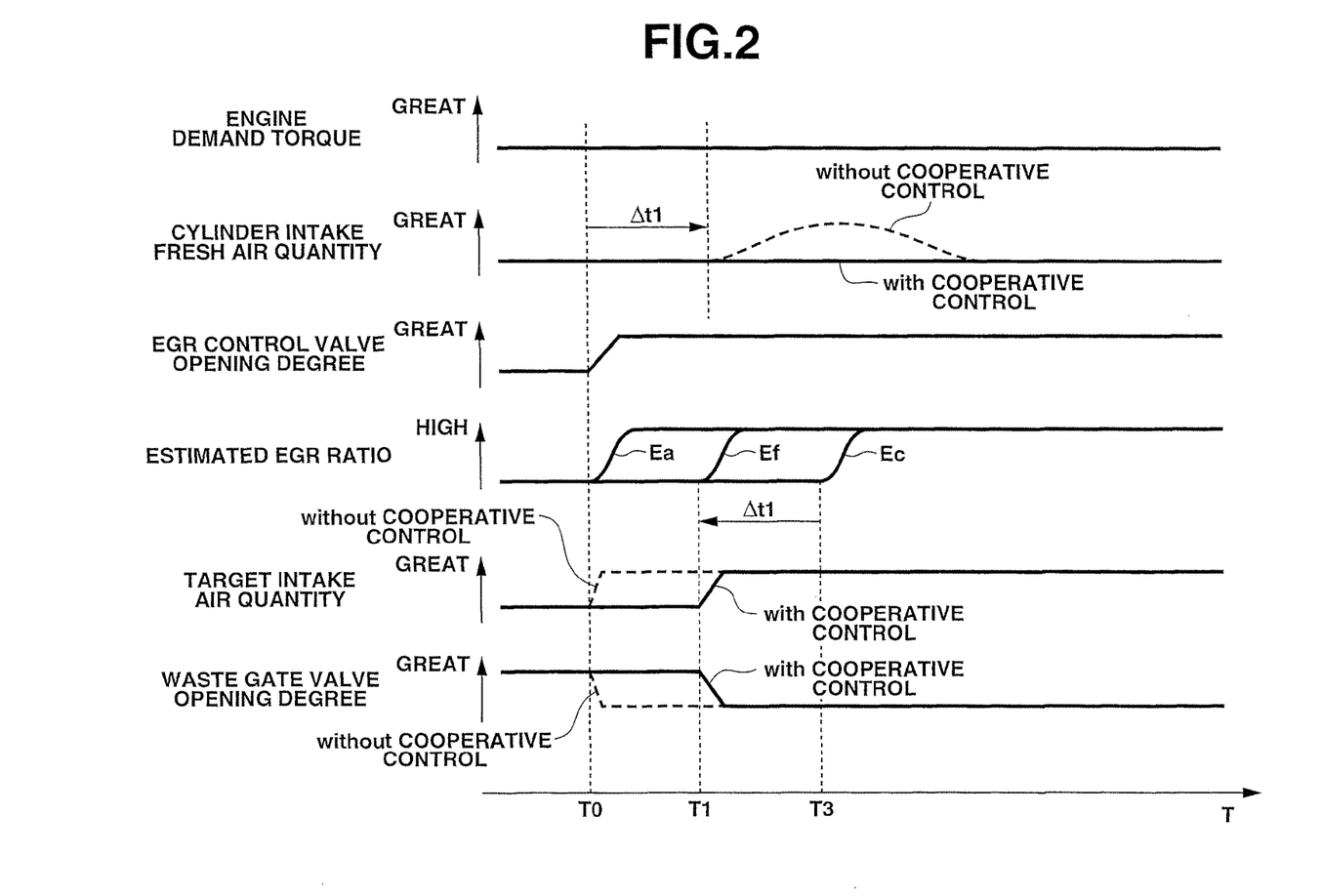
FIG. 2 is a timing chart showing each status at EGR start in a supercharging region according to a first embodiment.

For instance, in a case where the EGR is started during a steady operation (during an operation in which the engine demand torque is constant) in the supercharging region, as shown in FIG. 2, an EGR ratio in a first predetermined position in an intake system, which changes at a timing T1 that is a point in advance of a timing T3 at which the EGR ratio in the cylinder changes due to the change of the opening degree of the EGR control valve 21 by a cylinder-inside intake air quantity response time $\Delta t1$ (a time duration from a time point at which a target value of the waste gate valve 17 is changed up to a time point at which the fresh air quantity in the cylinder starts to change, i.e. a time duration required for the fresh air quantity in the cylinder to start to change after changing a target value of the waste gate valve 17) by the waste gate valve 17, is used for the control of the waste gate valve 17.

That is to say, in the case where the EGR is started in the supercharging region, the opening degree of the waste gate valve 17 is not changed at the same time (at a timing T0) as the valve open of the EGR control valve 21, but, as shown by a solid line in FIG. 2, the opening degree of the waste gate valve 17 is changed at the timing T1 at which the EGR ratio in the first predetermined position changes by the valve open of the EGR control valve 21. With this control, the fresh air quantity in the cylinder can be kept constant at the start of the EGR during the steady operation in the supercharging region.

The EGR ratio in the first predetermined position is estimated on the basis of, for instance, the quantity of the intake air, the EGR ratio at a joining point 31 between the EGR passage 20 and the intake passage 2 and a volume of a flow passage from the EGR control valve 21 to the first predetermined position.

Further, the first predetermined position is different depending on specifications of the intake system. For instance, in the present embodiment, in the case where the intake control device is the waste gate valve 17, the first predetermined position is almost the same position as the throttle valve 5 in the intake system. Then, the opening degree of the waste gate valve 17 is changed at a timing at which the EGR ratio changes in the position of the throttle valve 5.

Here, a broken line in FIG. 2 indicates a case (without the cooperative control) where the target value of the quantity of the intake air is changed, at the timing T0 of the EGR start, to the target value of the case where the EGR is carried out then the waste gate valve 17 is controlled. In addition, in FIG. 2, a characteristic line Ea indicates a change of an estimated EGR ratio at the joining point 31 between the EGR passage 20 and the intake passage 2, a characteristic line Ef indicates a change of an estimated EGR ratio in the first predetermined position, and a characteristic line Ec indicates a change of an estimated EGR ratio in the cylinder.

On the other hand, in such internal combustion engine 1, for instance, in a case where the EGR is started in the non-supercharging region, in order for the internal combustion engine 1 to attain the demand torque, it is necessary to control the throttle valve 5 so that a quantity of the fresh air in the cylinder where the fresh air is lacking is supplied or compensated by the introduction of the EGR. Also in this case, if the target value of the quantity of the intake air is changed, at the timing of the EGR start, to the target value of the case where the EGR is carried out, the opening degree of the throttle valve 5 is changed toward the valve open at the timing of the EGR start, and the quantity of the fresh air (the cylinder intake fresh air quantity) in the cylinder changes before the EGR ratio in the cylinder changes. A torque step thus occurs, and this causes deterioration in drivability.

Therefore, in the case where the EGR is started or stopped in the non-supercharging region, the change of the EGR ratio in the cylinder, which is caused by the change of the opening degree of the EGR control valve 21, is predicted in advance, then a cooperative control to control the opening degree of the throttle valve 5 on the basis of this prediction is executed.

Figure 3:
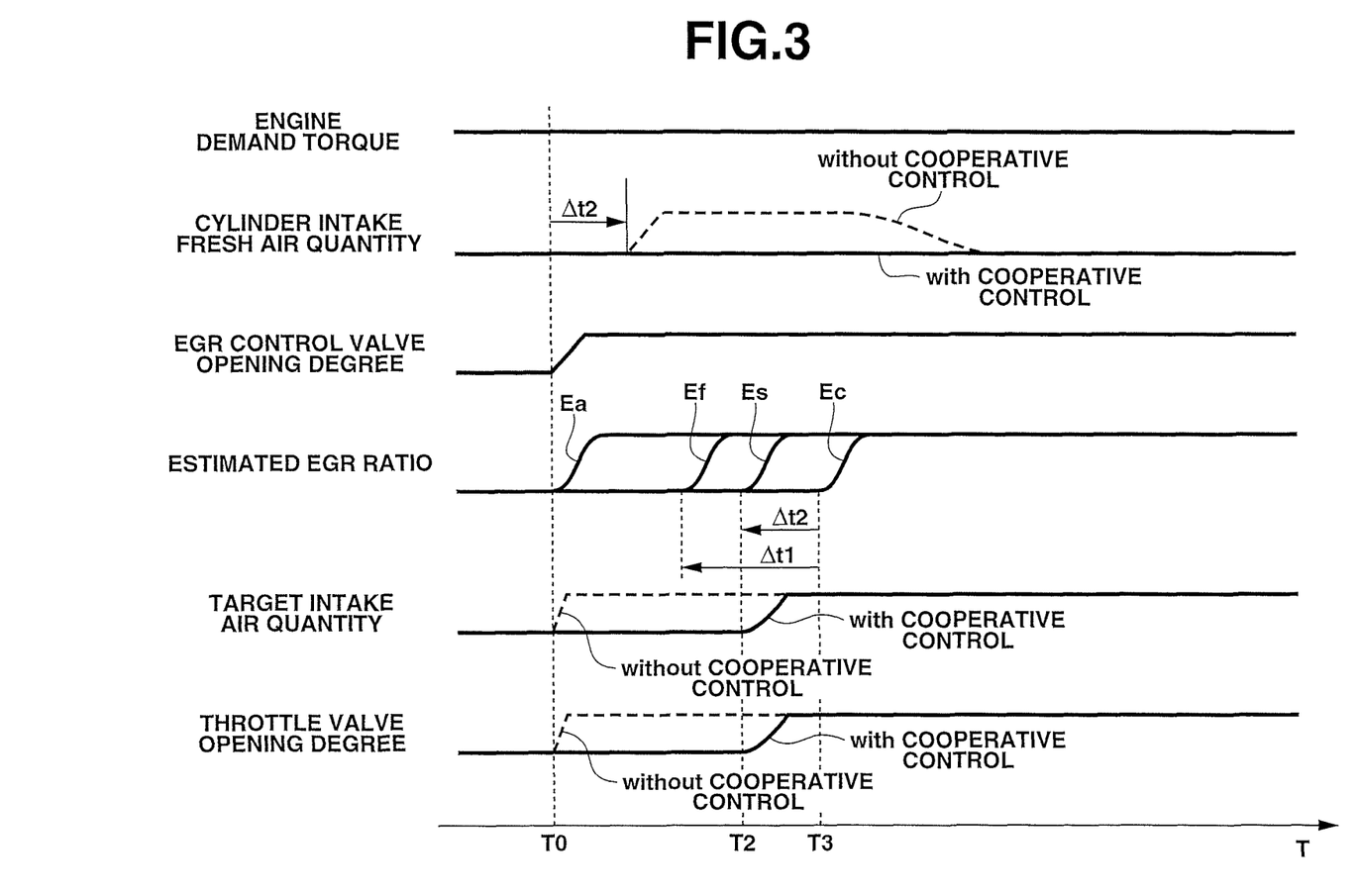
FIG. 3 is a timing chart showing each status at EGR start in a non-supercharging region according to the first embodiment.

For instance, in a case where the EGR is started during a steady operation (during an operation in which the engine demand torque is constant) in the non-supercharging region, as shown in FIG. 3, an EGR ratio in a second predetermined position in the intake system, which changes at a timing T2 that is a point in advance of the timing T3 at which the EGR ratio in the cylinder changes due to the change of the opening degree of the EGR control valve 21 by a cylinder-inside intake air quantity response time Δt2 (a time duration from a time point at which a target value of the throttle valve 5 is changed up to a time point at which the fresh air quantity in the cylinder starts to change, i.e. a time duration required for the fresh air quantity in the cylinder to start to change after changing a target value of the throttle valve 5) by the throttle valve 5, is used for the control of the throttle valve 5.

That is to say, in the case where the EGR is started in the non-supercharging region, the opening degree of the throttle valve 5 is not changed at the same time (at a timing T0) as the valve open of the EGR control valve 21, but, as shown by a solid line in FIG. 3, the opening degree of the throttle valve 5 is changed at the timing T2 at which the EGR ratio in the second predetermined position changes by the valve open of the EGR control valve 21. With this control, the fresh air quantity in the cylinder can be kept constant at the start of the EGR during the steady operation in the non-supercharging region.

The EGR ratio in the second predetermined position is estimated on the basis of, for instance, the quantity of the intake air, the EGR ratio at the joining point 31 between the EGR passage 20 and the intake passage 2 and a volume of a flow passage from the EGR control valve 21 to the second predetermined position.

In the present embodiment, in the case where the intake control device is the throttle valve 5, the second predetermined position is almost the same position as a front side of the intake collector 4a in the intake system. Then, the opening degree of the throttle valve 5 is changed at a timing at which the EGR ratio changes in the position of the front side of the intake collector 4a.

Here, since the cylinder-inside intake air quantity response time Δt2 by the throttle valve 5 is shorter than the cylinder-inside intake air quantity response time Δt1 by the waste gate valve 17, the second predetermined position is positioned at a cylinder 1a side with respect to the first predetermined position.

A broken line in FIG. 3 indicates a case (without the cooperative control) where the target value of the quantity of the intake air is changed, at the timing T0 of the EGR start, to the target value of the case where the EGR is carried out then the throttle valve 5 is controlled. In addition, in FIG. 3, a characteristic line Es indicates a change of an estimated EGR ratio in the second predetermined position.

In this manner, in the case where the opening degree of the EGR control valve 21 is changed, the timing at which the EGR ratio in the cylinder changes is predicted, the throttle valve 5 and the waste gate valve 17 that are the intake control devices are controlled on the basis of this prediction, and the quantity of the intake air is controlled so that the fresh air quantity in the cylinder does not change upon the change of the opening degree of the EGR control valve 21. With this control, an EGR transport route to the cylinder becomes relatively long by the fact that the EGR is introduced to the upstream side of the compressor 11 of the turbocharger 10. Thus, even in the system having possibility that the response delay from the time point at which the opening degree of the EGR control valve 21 is changed up to the time point at which the change of the EGR ratio in the cylinder appears becomes relatively long, it is possible to suppress the occurrence of the torque step upon the change of the opening degree of the EGR control valve 21 without distinction between the supercharging region and the non-supercharging region.

Here, the above first and second predetermined positions are each a system-specific value. In a case where each of these values does not change, a sensor that directly detects the EGR ratio could be provided at the first and second predetermined positions.

Further, in a case where the response time from the time point at which the target opening degree of the throttle valve 5 or the waste gate valve 17 is changed up to the time point at which the fresh air quantity in the cylinder starts to change changes and a cylinder-inside fresh air quantity response speed changes, the first and second predetermined positions could be changed according to the cylinder-inside fresh air quantity response speed. For instance, in a case where the cylinder-inside fresh air quantity response speed changes by an engine load, the first and second predetermined positions could be changed according to the engine load.

Figure 4:
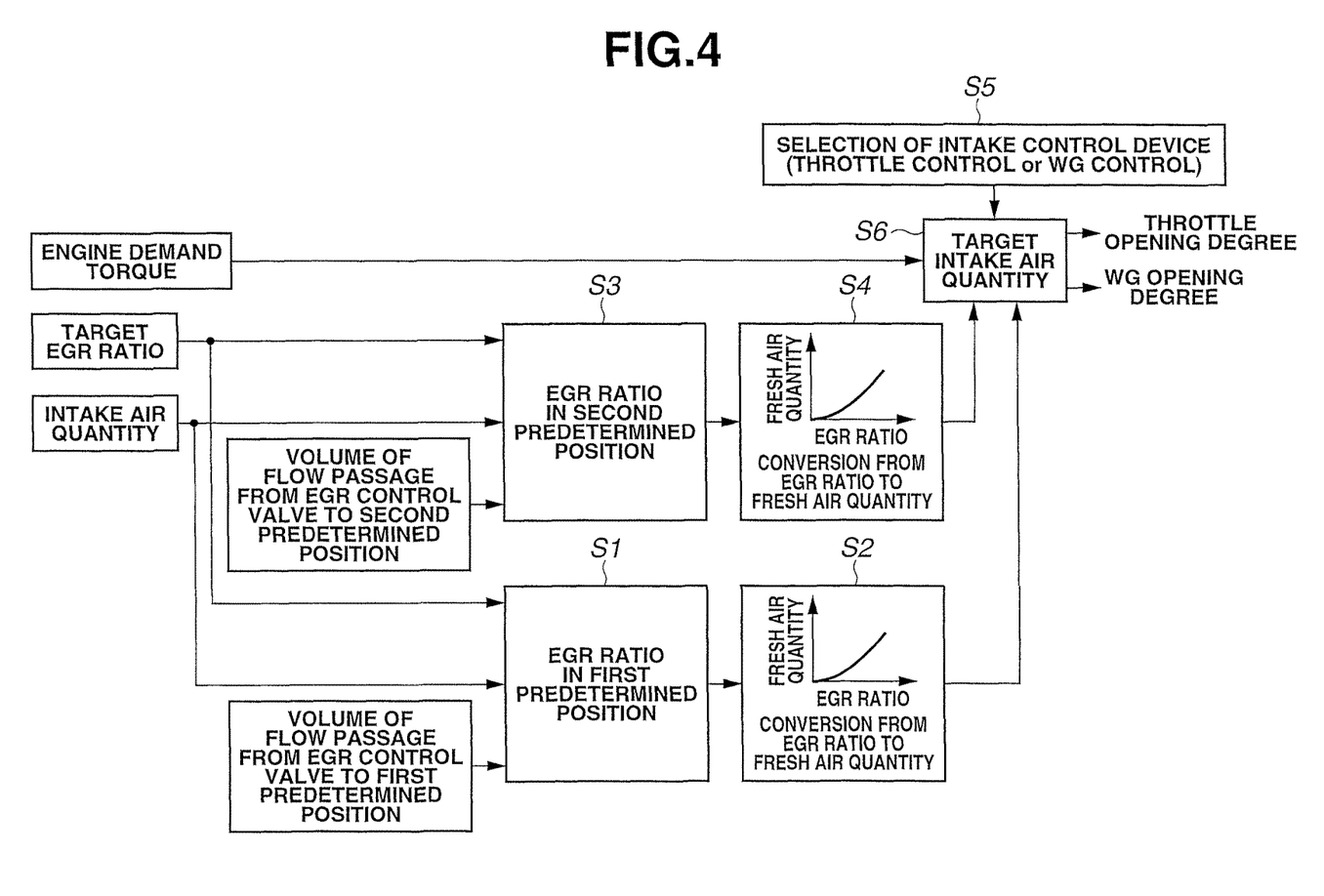
FIG. 4 is a block diagram showing a control operation according to the first embodiment.

FIG. 4 is a block diagram showing a control operation of the throttle valve 5 or the waste gate valve 17 in the first embodiment described above.

At S1, the EGR ratio in the first predetermined position is calculated using the target EGR ratio fixed by the operating condition, the quantity of the intake air and the volume of the flow passage from the EGR control valve 21 to the first predetermined position. That is, at S1, the EGR ratio in the first predetermined position in the case where the intake control device is the waste gate valve 17 is calculated. At S2, the quantity of the fresh air to be introduced into the cylinder is calculated using the EGR ratio calculated at S1.

At S3, the EGR ratio in the second predetermined position is calculated using the target EGR ratio fixed by the operating condition, the quantity of the intake air and the volume of the flow passage from the EGR control valve 21 to the second predetermined position. That is, at S3, the EGR ratio in the second predetermined position in the case where the intake control device is the throttle valve 5 is calculated. At S4, the quantity of the fresh air to be introduced into the cylinder is calculated using the EGR ratio calculated at S3. At S5, the intake control device is selected.

At S6, the throttle valve 5 and the waste gate valve 17 are controlled according to the engine demand torque and the selected intake control device. That is, in the case where the selected intake control device is the waste gate valve 17, the target intake air quantity is calculated according to the engine demand torque and the fresh air quantity calculated at S2, and the waste gate valve 17 is controlled so that the quantity of the intake air becomes the calculated target intake air quantity. In the case where the selected intake control device is the throttle valve 5, the target intake air quantity is calculated according to the engine demand torque and the fresh air quantity calculated at S4, and the throttle valve 5 is controlled so that the quantity of the intake air becomes the calculated target intake air quantity.

Next, a second embodiment of the present invention will be explained. Also in the second embodiment, in the same way as the first embodiment, the change of the EGR ratio in the cylinder, which is caused by the change of the opening degree of the EGR control valve 21, is predicted in advance, then the intake control device is controlled on the basis of this prediction. However, in the second embodiment, a delay time from a time point at which the opening degree of the EGR control valve 21 is changed up to a time point at which the EGR ratio in the first predetermined position changes, or a delay time from a time point at which the opening degree of the EGR control valve 21 is changed up to a time point at which the EGR ratio in the second predetermined position changes, is used for the control of the intake control device.

Figure 5:
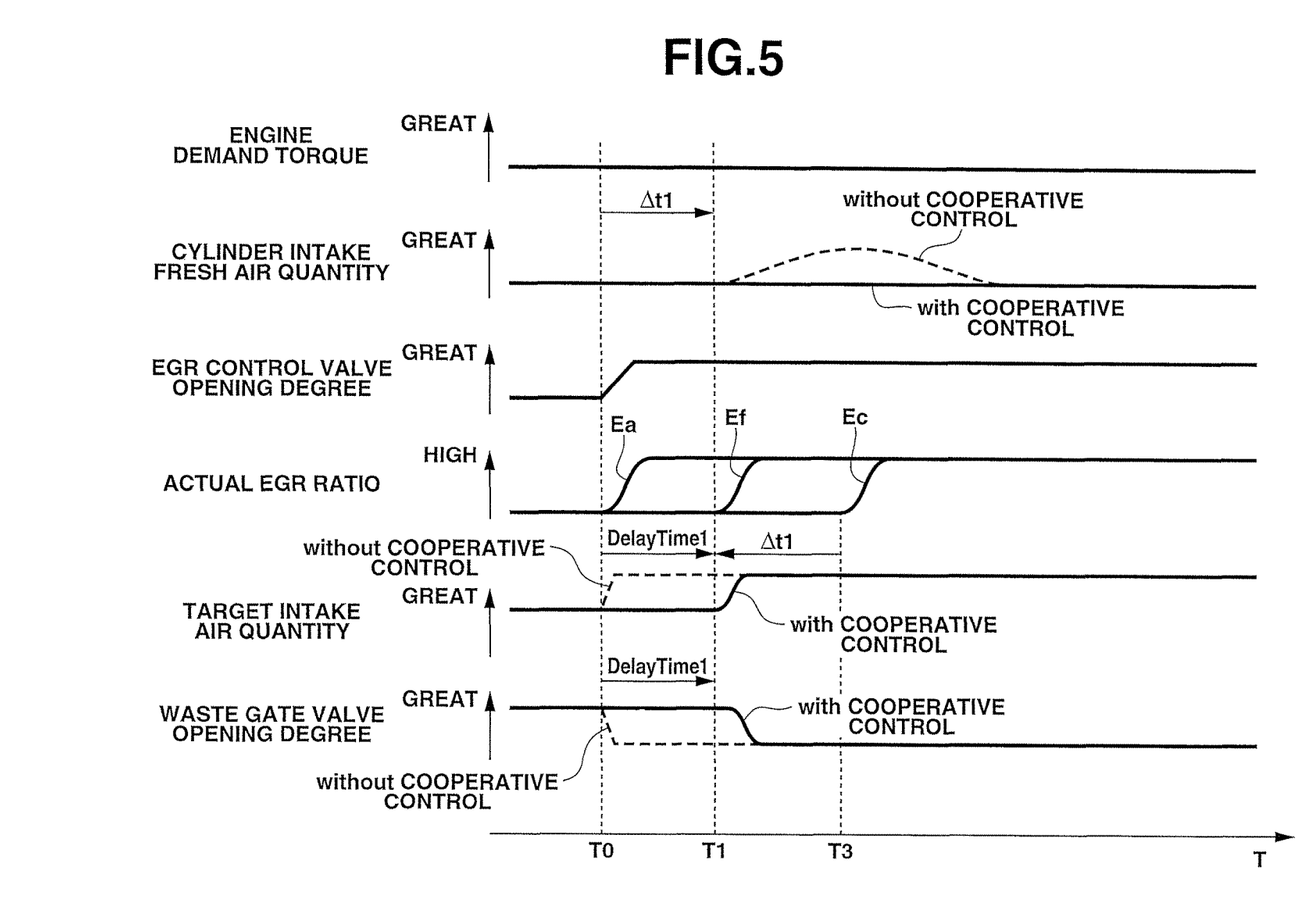
FIG. 5 is a timing chart showing each status at EGR start in the supercharging region according to a second embodiment.

For instance, in the case where the EGR is started during the steady operation (during the operation in which the engine demand torque is constant) in the supercharging region, as shown in FIG. 5, a first delay time (Delay Time 1) that is an elapsed time from a timing T0 at which the opening degree of the EGR control valve 21 is changed up to a timing T1 at which the EGR ratio in the first predetermined position changes is predicted. Then, the opening degree of the waste gate valve 17 is not changed at the same time as the change of the opening degree of the EGR control valve 21, but after the change of the opening degree of the EGR control valve 21, a cooperative control to change the opening degree of the waste gate valve 17 is executed at the timing T1 at which this first delay time elapses.

Put another way, in the case where the EGR is started in the supercharging region, the first delay time (Delay Time 1) required for the EGR passing through the EGR control valve 21 to reach the first predetermined position is calculated, then the opening degree of the waste gate valve 17 is changed at the timing T1 at which this first delay time elapses. With this control, the fresh air quantity in the cylinder can be kept constant at the start of the EGR during the steady operation in the supercharging region.

The first delay time is estimated on the basis, for instance, the quantity of the intake air and the volume of the flow passage from the EGR control valve 21 to the first predetermined position.

Here, a broken line in FIG. 5 indicates a case (without the cooperative control) where the target value of the quantity of the intake air is changed, at the timing T0 of the EGR start, to the target value of the case where the EGR is carried out then the waste gate valve 17 is controlled. In addition, in FIG. 5, a characteristic line Ea indicates a change of an actual EGR ratio at the joining point 31 between the EGR passage 20 and the intake passage 2, a characteristic line Ef indicates a change of an actual EGR ratio in the first predetermined position, and a characteristic line Ec indicates a change of an actual EGR ratio in the cylinder.

Figure 6:
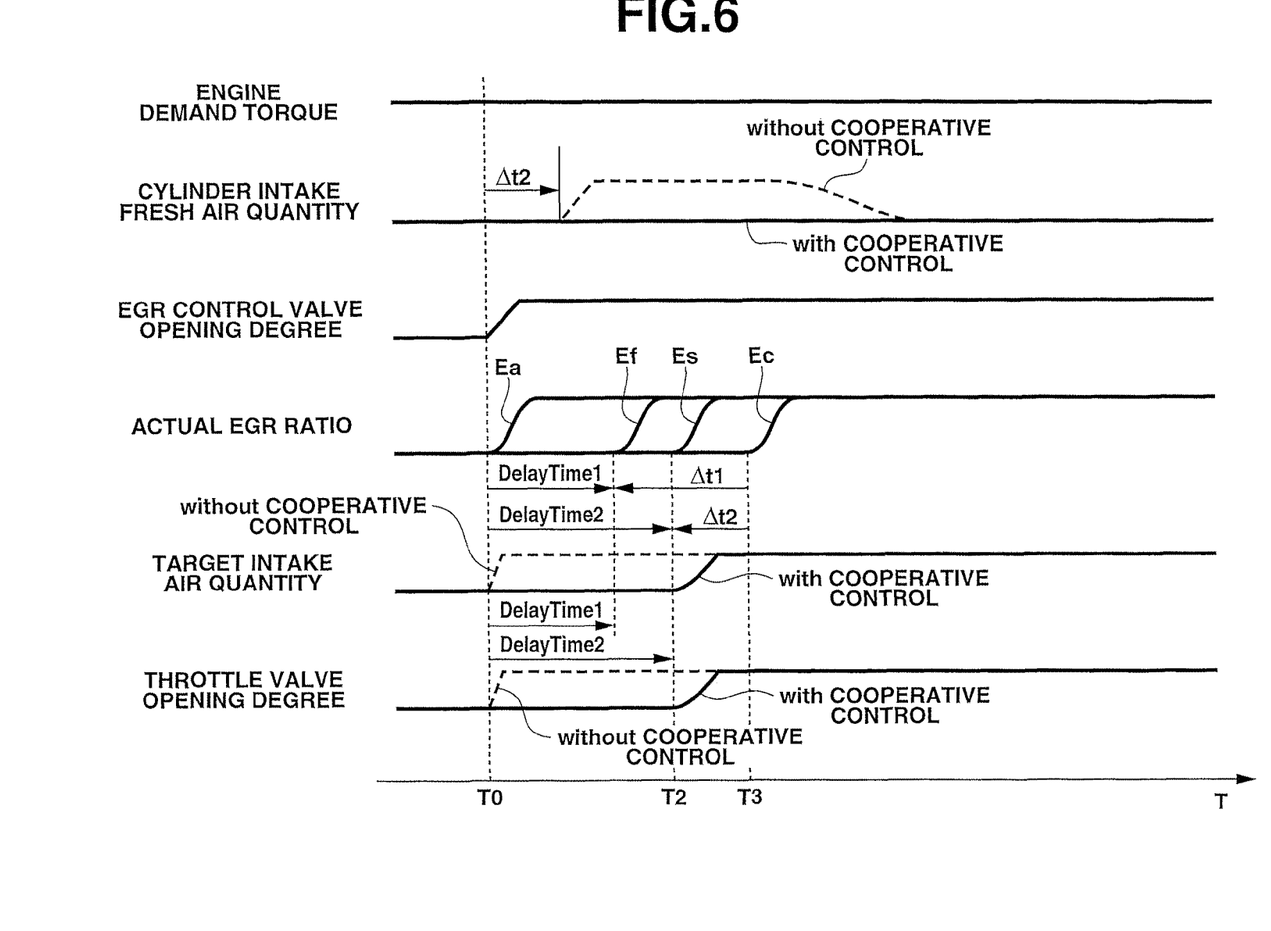
FIG. 6 is a timing chart showing each status at EGR start in the non-supercharging region according to the second embodiment.

Furthermore, for instance, in the case where the EGR is started during the steady operation (during the operation in which the engine demand torque is constant) in the non-supercharging region, as shown in FIG. 6, a second delay time (Delay Time 2) that is an elapsed time from a timing T0 at which the opening degree of the EGR control valve 21 is changed up to a timing T2 at which the EGR ratio in the second predetermined position changes is predicted. Then, the opening degree of the throttle valve 5 is not changed at the same time as the change of the opening degree of the EGR control valve 21, but after the change of the opening degree of the EGR control valve 21, a cooperative control to change the opening degree of the throttle valve 5 is executed at the timing T2 at which this second delay time elapses.

Put another way, in the case where the EGR is started in the non-supercharging region, the second delay time (Delay Time 2) required for the EGR passing through the EGR control valve 21 to reach the second predetermined position is calculated, then the opening degree of the throttle valve 5 is changed at the timing T2 at which this second delay time elapses. With this control, the fresh air quantity in the cylinder can be kept constant at the start of the EGR during the steady operation in the non-supercharging region.

The second delay time is estimated on the basis, for instance, the quantity of the intake air and the volume of the flow passage from the EGR control valve 21 to the second predetermined position.

Here, the second delay time corresponds to a time required for the EGR passing through the EGR control valve 21 to reach the second predetermined position that is positioned at a cylinder 1a side with respect to the first predetermined position. The second delay time is a value that is greater than the first delay time.

A broken line in FIG. 6 indicates a case (without the cooperative control) where the target value of the quantity of the intake air is changed, at the timing T0 of the EGR start, to the target value of the case where the EGR is carried out then the throttle valve 5 is controlled. In addition, in FIG. 6, a characteristic line Es indicates a change of an actual EGR ratio in the second predetermined position.

Figure 7:
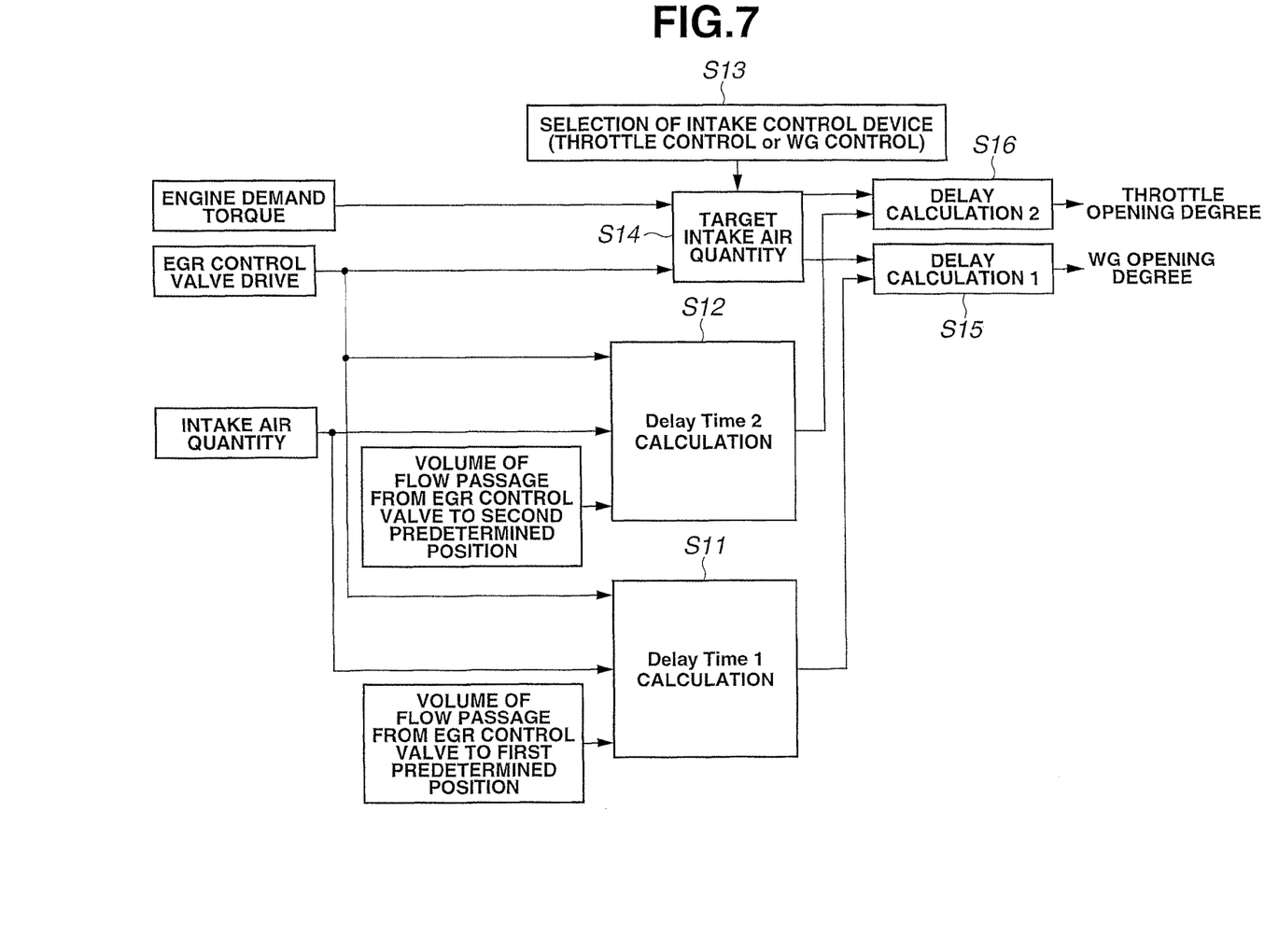
FIG. 7 is a block diagram showing a control operation according to the second embodiment.

FIG. 7 is a block diagram showing a control operation of the throttle valve 5 or the waste gate valve 17 in the second embodiment described above.

At S11, the first delay time from the time point at which the EGR control valve 21 is driven up to the time point at which the EGR ratio in the first predetermined position changes is calculated using the quantity of the intake air and the volume of the flow passage from the EGR control valve 21 to the first predetermined position.

At S12, the second delay time from the time point at which the EGR control valve 21 is driven up to the time point at which the EGR ratio in the second predetermined position changes is calculated using the quantity of the intake air and the volume of the flow passage from the EGR control valve 21 to the second predetermined position. At S13, the intake control device is selected.

At S14, the target intake air quantity is calculated according to the engine demand torque and the opening degree of the EGR control valve 21, and the throttle valve 5 and the waste gate valve 17 are controlled so that the quantity of the intake air becomes the calculated target intake air quantity.

Then, in the case where the intake control device is the waste gate valve 17, upon the EGR start, at S15, the opening degree of the waste gate valve 17 is controlled so as to attain the target intake air quantity calculated at S14 at the timing at which time is delayed by the first delay time calculated at S11 after the EGR control valve 21 is driven.

Further, in the case where the intake control device is the throttle valve 5, upon the EGR start, at S16, the opening degree of the throttle valve 5 is controlled so as to attain the target intake air quantity calculated at S14 at the timing at which time is delayed by the second delay time calculated at S12 after the EGR control valve 21 is driven.

Also in the second embodiment as described above, since the quantity of the intake air is controlled so that the fresh air quantity in the cylinder does not change upon the change of the opening degree of the EGR control valve 21, in the same way as the first embodiment, it is possible to suppress the occurrence of the torque step upon the change of the opening degree of the EGR control valve 21 without distinction between the supercharging region and the non-supercharging region.

Figure 8:
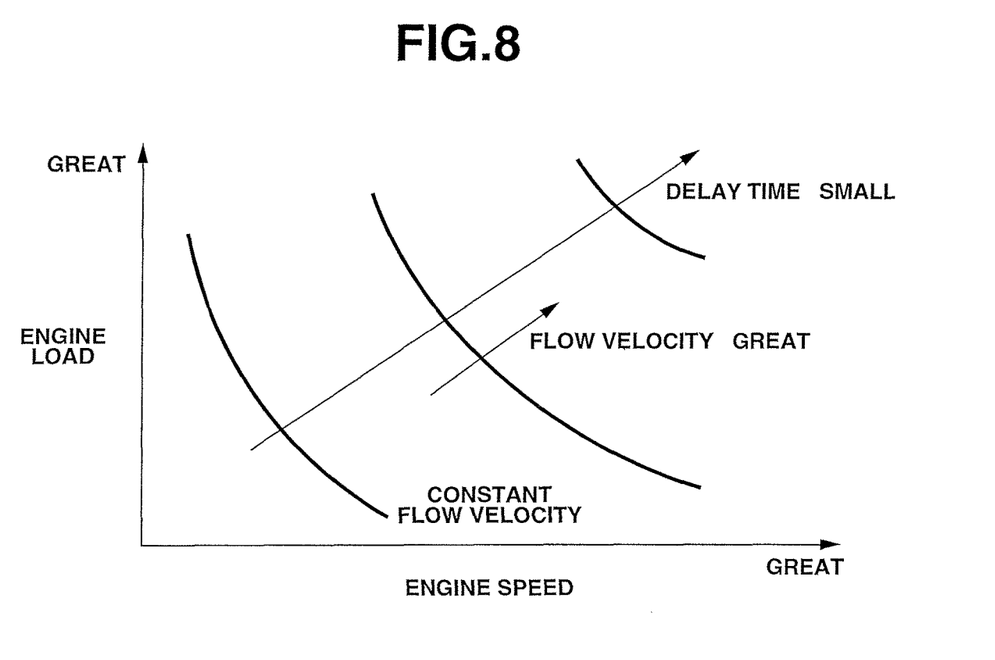
FIG. 8 is a delay time calculation map.

Here, the first delay time and the second delay time in this second embodiment are calculated according to the quantity of the intake air, the volume of the flow passage from the EGR control valve 21 to the first predetermined position and the volume of the flow passage from the EGR control valve 21 to the second predetermined position. However, these first and second delay times could be calculated from the engine load, an engine speed and an intake flow velocity. In this case, although the delay time can be calculated as necessitated from the engine load, the engine speed and the intake flow velocity, a delay time calculation map as shown in FIG. 8, in which the engine load, the engine speed, the intake flow velocity and the delay time are associated with each other, is previously prepared as experimental data, and the delay time could be calculated with reference to this delay time calculation map. In this FIG. 8, the delay time is set so that the greater the engine load, the smaller the delay time, and the greater the engine speed, the smaller the delay time, also the higher the intake flow velocity, the smaller the delay time.

In each embodiment described above, when the target value is changed, each opening degree of the throttle valve 5, the waste gate valve 17 and the EGR control valve 21 is changed to the target opening degree with almost no response delay.

The invention claimed is:

1. A control device of an internal combustion engine having a supercharger arranged at an upstream side of a throttle valve, an EGR passage recirculating, as EGR, a part of exhaust gas from an upstream side with respect to the supercharger and an EGR control valve disposed at some midpoint in the EGR passage, the control device comprising:
   an EGR ratio prediction unit that predicts, in advance, a change of an EGR ratio in a cylinder of the internal combustion engine which is caused by a change of an opening degree of the EGR control valve; and
   an intake control device that controls a quantity of intake air, and
   the EGR ratio prediction unit determining, according to at least an engine operating condition, a predetermined position in an intake system at which the EGR ratio changes at a timing that is a time point in advance of a timing at which the EGR ratio in the cylinder changes due to the change of the opening degree of the EGR control valve by an intake control device response time required for a quantity of fresh air in the cylinder to start to change after changing the quantity of the intake air by the intake control device, and predicting the EGR ratio at the predetermined position, and
   the intake control device being controlled on the basis of the EGR ratio at the predetermined position.

2. The control device of the internal combustion engine as claimed in claim 1, wherein:
   the supercharger is a device that drives a compressor disposed in the intake passage by a turbine disposed in an exhaust passage,
   a bypass passage bypassing the turbine, in which a waste gate valve that controls an exhaust flow amount is installed, is connected to the exhaust passage, and
   when the waste gate valve is used as the intake control device, as compared to when the throttle valve is used as the intake control device, the predetermined position is shifted to an upstream side.

3. The control device of the internal combustion engine as claimed in claim 1, wherein:
   the EGR ratio in the predetermined position is detected by an EGR ratio-detectable sensor.

4. A control device of an internal combustion engine having a supercharger arranged at an upstream side of a throttle valve, an EGR passage recirculating, as EGR, a part of exhaust gas from an upstream side with respect to the supercharger and an EGR control valve disposed at some midpoint in the EGR passage, the control device comprising:
   an EGR ratio prediction unit that predicts, in advance, a change of an EGR ratio in a cylinder of the internal combustion engine which is caused by a change of an opening degree of the EGR control valve; and
   an intake control device that controls a quantity of intake air, and
   the EGR ratio prediction unit setting a predetermined position in an intake system at which the EGR ratio changes at a timing that is a time point in advance of a timing at which the EGR ratio in the cylinder changes due to the change of the opening degree of the EGR control valve by an intake control device response time required for a quantity of fresh air in the cylinder to start to change after changing the quantity of the intake air by the intake control device, and predicting a delay time required for the EGR ratio at the predetermined position to change after changing the opening degree of the EGR control valve, and
   when changing the opening degree of the EGR control valve, a target value of the intake control device being changed after a lapse of the delay time from the change of the opening degree of the EGR control valve.

5. The control device of the internal combustion engine as claimed in claim 4, wherein:
   the supercharger is a device that drives a compressor disposed in the intake passage by a turbine disposed in an exhaust passage,
   a bypass passage bypassing the turbine, in which a waste gate valve that controls an exhaust flow amount is installed, is connected to the exhaust passage, and
   when the waste gate valve is used as the intake control device, as compared to when the throttle valve is used as the intake control device, the predetermined position is shifted to an upstream side.

6. A method for controlling an internal combustion engine comprising:
   predicting, in advance, a change of an EGR ratio in a cylinder of the internal combustion engine which is caused by a change of an opening degree of an EGR control valve disposed in an EGR passage recirculating, as EGR, a part of exhaust gas from an upstream side with respect to a supercharger arranged at an upstream side of a throttle valve;
   determining according to at least an engine operating condition, a predetermined position in an intake system at which the EGR ratio changes at a timing that is a time point in advance of a timing at which the EGR ratio in the cylinder changes due to the change of the opening degree of the EGR control valve by an intake control device response time required for a quantity of fresh air in the cylinder to start to change after changing a quantity of intake air by an intake control device that controls the quantity of the intake air, the predetermined position being set at a downstream-side position with respect to a joining point between the EGR passage and an intake passage and also at an upstream-side position with respect to the cylinder; and controlling the intake control device on the basis of the EGR ratio at the predetermined position.

* * * * *